Oct. 1, 1974  R. E. DRAKE  3,839,532

METHOD OF MAKING A PRESTRESSED REINFORCED CORRUGATED SHEET

Filed Feb. 17, 1972  7 Sheets-Sheet 1

Oct. 1, 1974  R. E. DRAKE  3,839,532
METHOD OF MAKING A PRESTRESSED REINFORCED CORRUGATED SHEET
Filed Feb. 17, 1972  7 Sheets-Sheet 3
FIG. 5
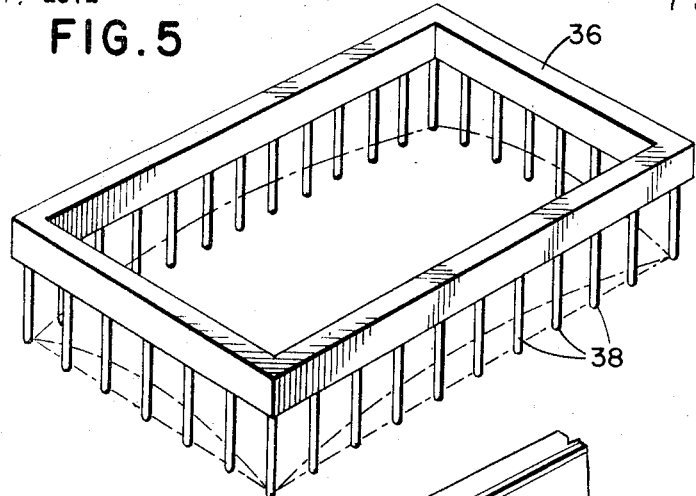
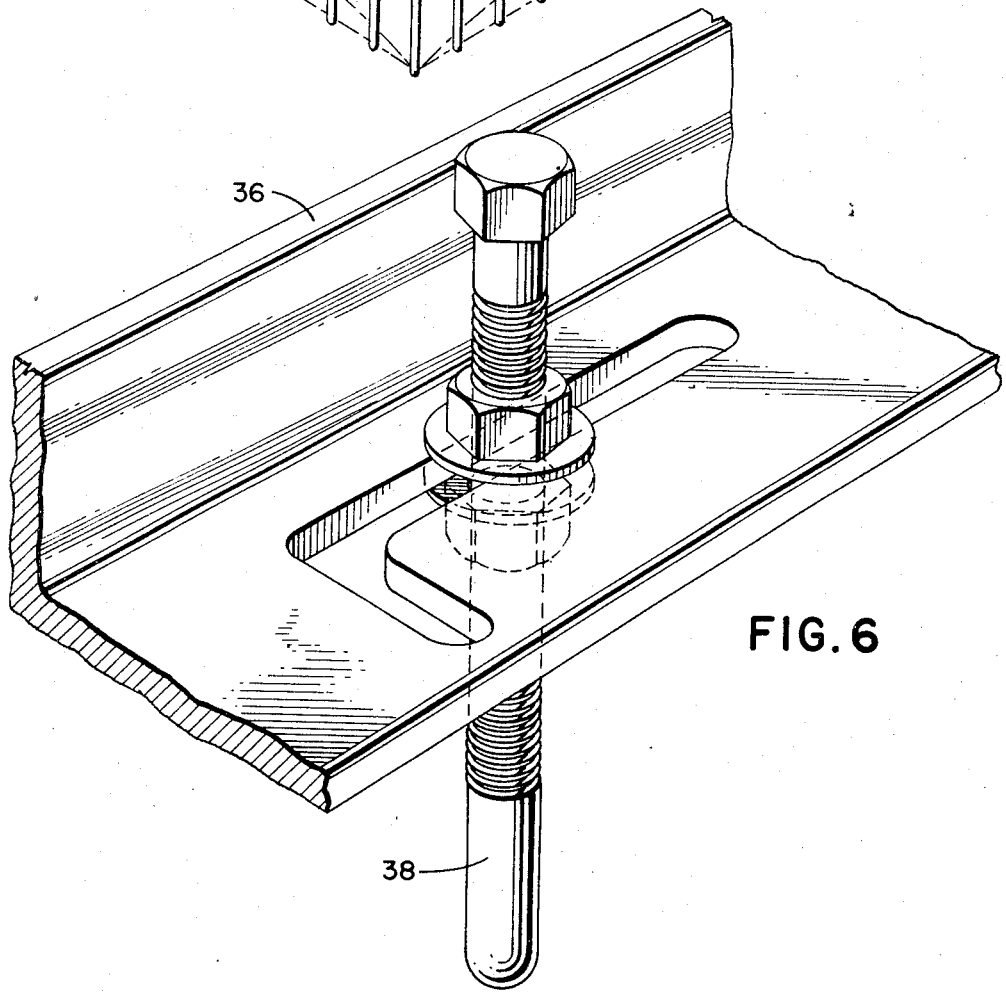
FIG. 6

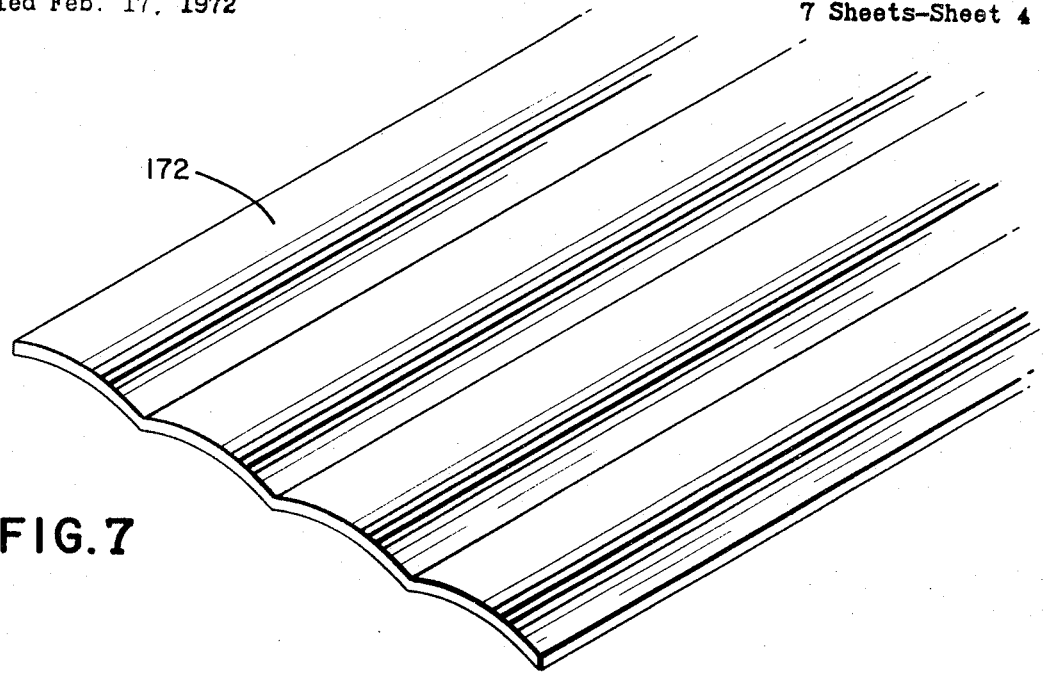
FIG. 7
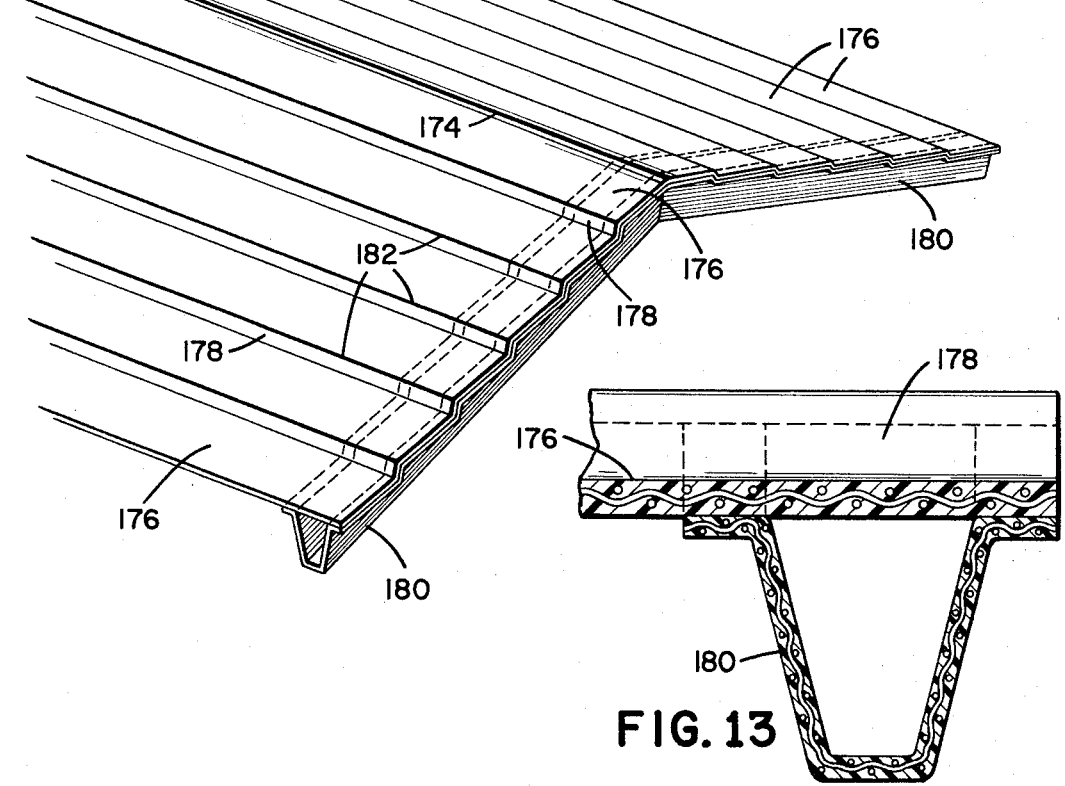
FIG. 12
FIG. 13

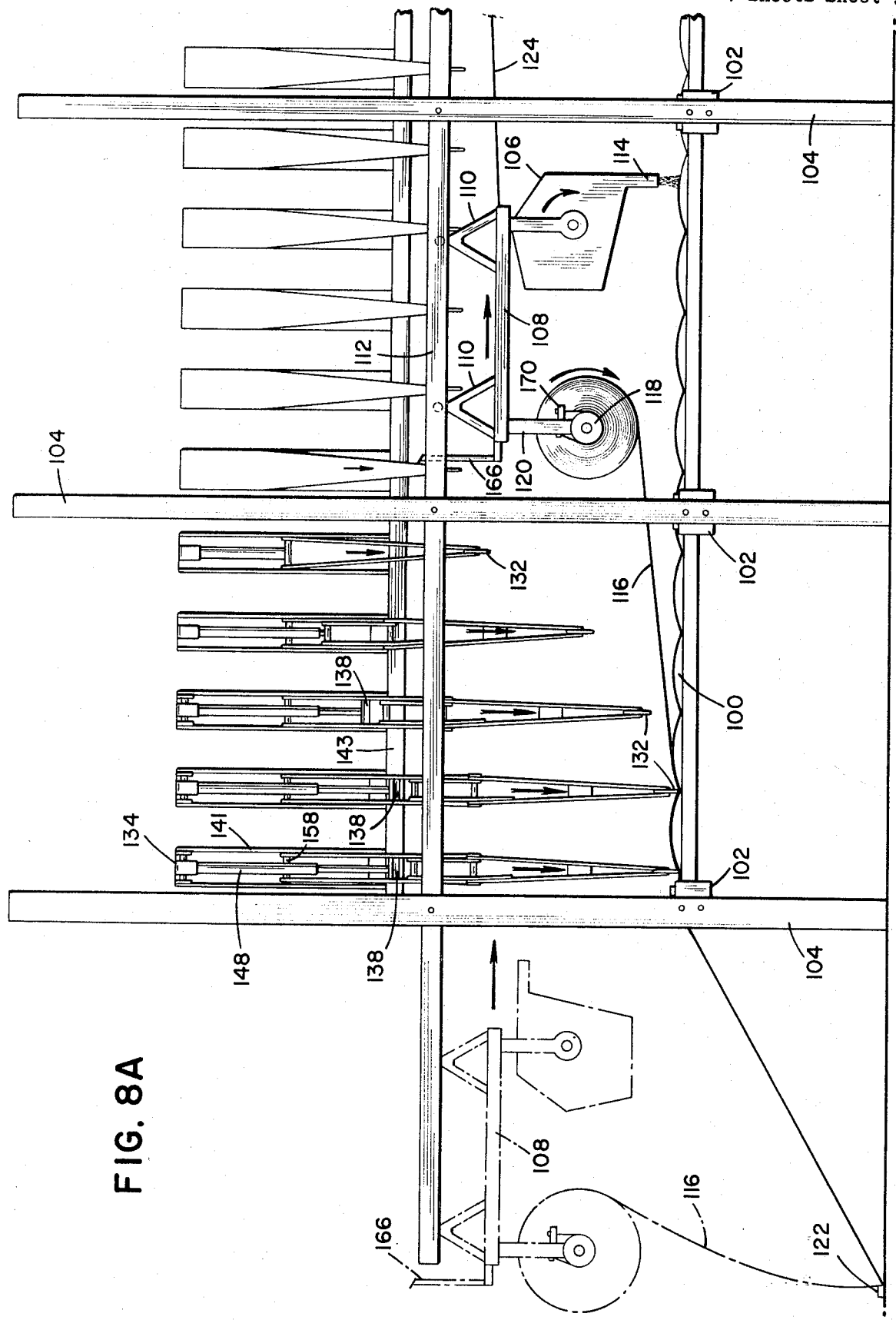

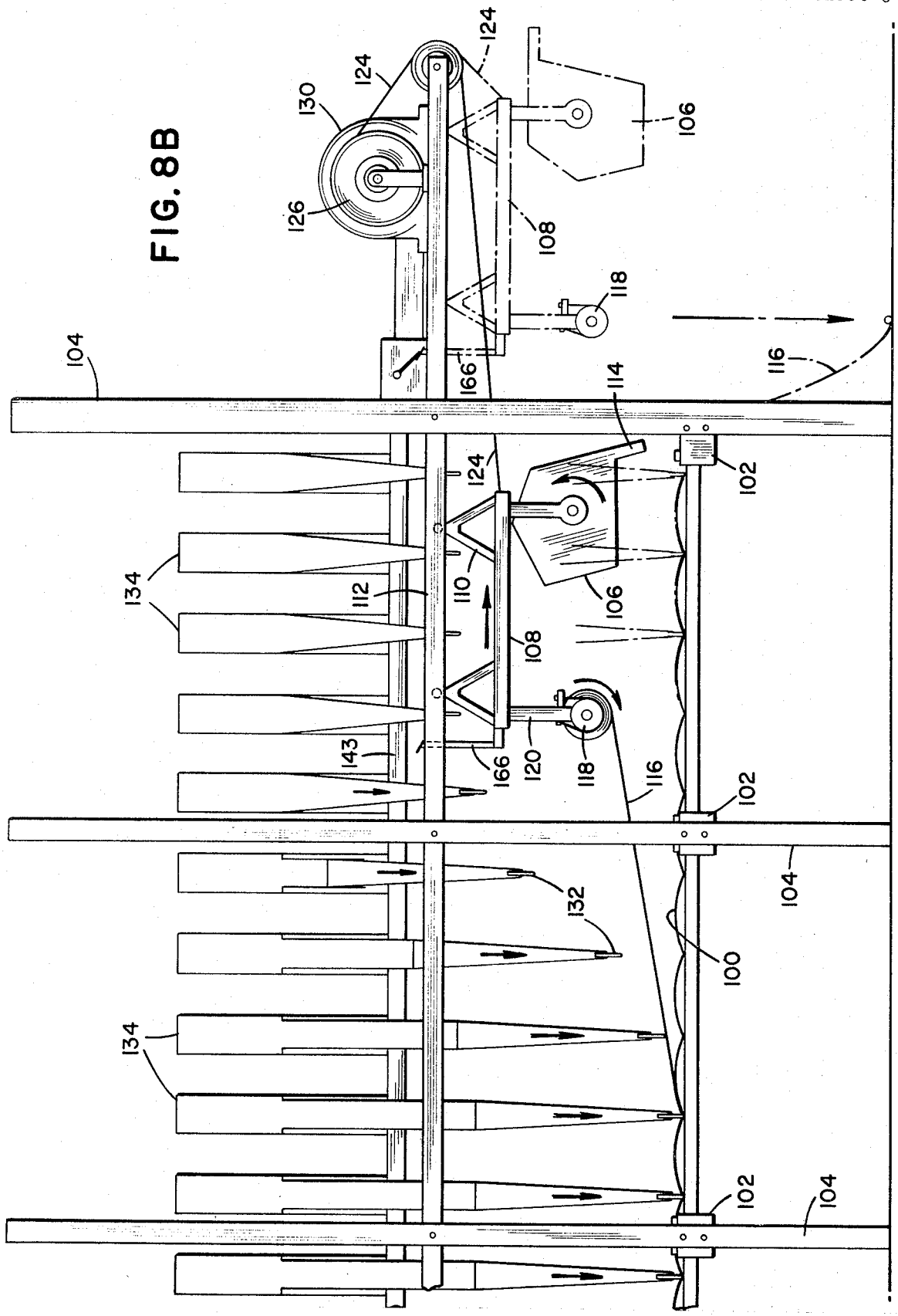

Oct. 1, 1974 R. E. DRAKE 3,839,532
METHOD OF MAKING A PRESTRESSED REINFORCED CORRUGATED SHEET
Filed Feb. 17, 1972 7 Sheets-Sheet 7
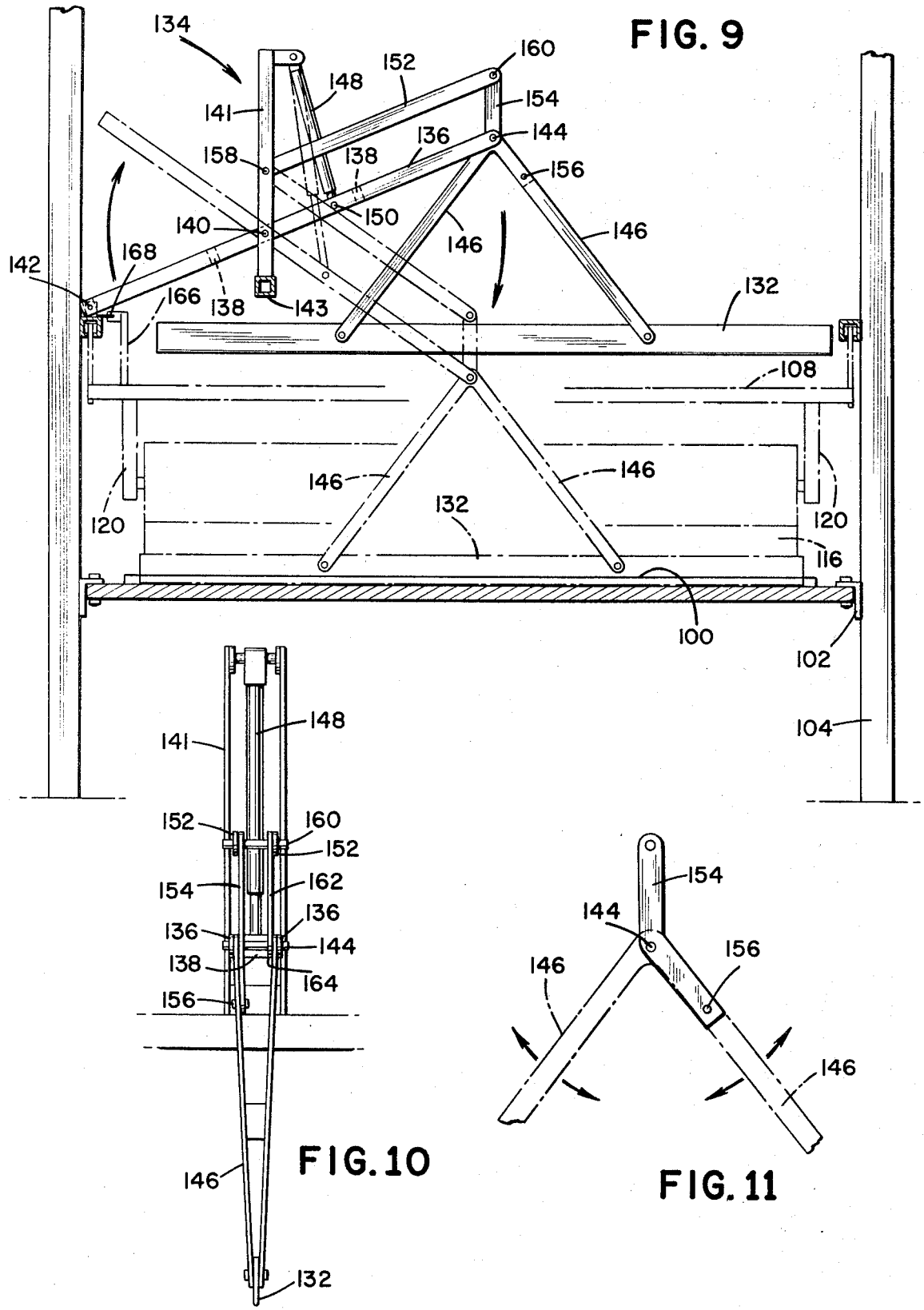

United States Patent Office 3,839,532
Patented Oct. 1, 1974

3,839,532
METHOD OF MAKING A PRESTRESSED REIN-
FORCED CORRUGATED SHEET
Robert E. Drake, 3265 11th Ave.,
Vero Beach, Fla. 32960
Filed Feb. 17, 1972, Ser. No. 227,219
Int. Cl. B29d 3/02
U.S. Cl. 264—229                              9 Claims

ABSTRACT OF THE DISCLOSURE

Methods for making molded products involving uniting a reinforcing material, such as a glass roving fabric, with a curable or settable mass, such as a polyester resin, by applying pressure to the reinforcing material at or on selected points or lines by material contacting means positioned correspondingly to said points or lines whereby the mass is displaced into or through the reinforcing material throughout its area by the applied pressure. New products are disclosed.

---

This invention relates to the art of low-pressure molding. The invention involves both process and apparatus features, and to products obtained therefrom. Primarily, the invention is concerned with the production of shaped parts or objects comprised of organic polymeric resinous materials which undergo curing, or setting up, to solid form during molding, and which are reinforced with a substrate material such as a glass fabric of a foraminous nature. The invention is especially concerned with the production of large items such as building components, i.e., sidewalls, roofs, flooring, etc., storage tanks, greenhouses, boats, etc. which heretofore have presented a variety of difficulties to the molding industry. The principal difficulty has involved the inability of industry to build practical large-scale molding equipment capable of associating reinforcing fabrics without excessive labor and time. The users of present low-pressure molding equipment are troubled with problems such as, the easy and quick handling of the sticky, wet resinous materials, the hand working of such materials to conform them to the mold surface, removal of air bubbles, excessive resin waste and mold cleaning expense, lack of large part capability, slow cycling time, restriction as regards type of resinous materials, i.e., incapability of use of fast curing resins due to necessary hand placement and working of materials, high initial and amortization costs of equipment and relatively high skill required of operators of such equipment. There are still other problems and disadvantages to practical production using known methods and apparatus.

The present invention seeks to alleviate, or substantially relieve, many of such problems and to eliminate others. The advantages of the present invention can readily be appreciated from a discussion of the general nature of the apparatus and the method which employs it. Such a general discussion is set forth below, and there follows a detailed description of a specific form of apparatus which embodies the basic concepts and teachings of the invention.

The molding equipment and method differs fundamentally from the contemporary molds used to produce, e.g., fiber glass boats; it cannot be described categorically with the hand lay-up, matched mold, vacuum bag, pressure bag, injection, casting, compression, spray up, blow, or centrifugal molding.

The new system of this invention i.e., the affiliated method and apparatus is relatively limitless in the size of the part it can produce. It encourages the use of low cost resins and reinforcing materials, thus permitting many end uses. The system has automation capability much greater than hand lay-up, casting, matched molds, vacuum bag, spray up, pressure bag, blow, centrifugal and in some respects is equal to injection and compression molding, while still retaining its extremely large part capability. The system is uncomplicated and therefore operational by relatively low skill labor. It is easy to clean and maintain because it is a dry lay-up process, eliminating the messiness which is characteristic of most wet plastic industries, and the fastest curing resin systems available at this time may be processed. It has the advantage of matched molding, yet it permits compound or secondary molding of additional sections while the main part is still in its primary molding cycle. While most satisfactory for wet plastics molding, the system can be used for thermoplastic molding (vacuum forming). The system involves extremely low operating pressure during its forming or closing cycle, thus eliminating the purchase and operation cost of heavy pressurizing machinery. It is ideally suited to the use of large inexpensive, load carrying inserts which may start out as part of the molding system but end up within the part, thus eliminating secondary production line assembly of beams, ribs, hats, bulkheads, etc. for structural use. The equipment is cheap to design, build and operate.

The general concept of the method and apparatus involves the provision of (1) a mold face having a configuration complementary to the surface character of the piece to be molded such as a fluted panel (in which case the mold surface may be described as uniformly undulating in crests and valleys), upon which the resinous material to be cured is deposited in a uniform manner, (2) the placement of a reinforcing, foraminous sheet i.e., fabric over the resinous material, (3) forcing the fabric into the resinous material, and also into general conformity with the mold surface, by means of shape-generating members which are brought into contact with the fabric along lines delineating the flutes i.e., along the valley lines, and which by reason of the weight of the members and any associated elements, presses the fabric into the valleys, simultaneously and effects an overall stretching of the fabric over the curvilinear fluted surfaces and embedding of it into the resinous mass throughout the entire molding surface (the resin being forced upwardly into and through the fabric), and (4) allowing or causing the resin to cure or set to gelled mold-conforming shape. The fluted panel may then be released from the mold.

From the foregoing, it will be appreciated that the general concept of the invention has applicability to substantially all normally moldable products, substantially regardless of their form. In molding terminology, therefore, the mold surface or face may be described broadly as hermaphroditic and the cooperating members generally conforms to lines of the mold face which define the male component.

A further important aspects of the method and apparatus involves the simultaneous molding and joining of secondary pieces or components upon the primary piece, i.e., for example, reinforcing members joined with the above-mentioned fluted panel. In this aspect of the invention, shaped but uncured ribs are delivered to the panel surface that is undergoing curing and positioned upon and along the length of the curving flutes. The ribs are pressed into firm engagement with the resin of the panel and the two components simultaneously cure to a unified structure. From this it will be seen that any two or more pieces that are undergoing curing may be joined as one unified product in a single operation. The invention therefore contemplates compound molding, i.e., simultaneous molding and joining of two or more parts which are undergoing curing.

The present specification sets forth a description of the method and apparatus showing their application to the production of such a panel. The invention may readily be understood from one simple illustration but, as will be more fully pointed out hereinafter, there are innumerable possible variations of apparatus, as well as method aspects, within the broad principle of the teaching.

The invention is illustrated by drawings wherein:

FIG. 5 is a depiction of a modified form of apparatus;

FIG. 6 is a fragmentary enlargement of a part of FIG. 5;

FIG. 7 is a showing of a product as produced from the indications of FIGS. 1–4;

FIGS. 8–9 indicate automatic molding apparatus, FIGS. 8A and 8B constituting a view in side elevation on two sheets and FIG. 9 being an end view, all figures containing some showing in phantom lines to avoid unnecessary complexity and to aid in revealing actual operation of the apparatus and method;

FIG. 10 is an enlarged view of a portion of the holding and release mechanism as seen in FIGS. 8–9;

FIG. 11 is a view of an element of the assembly shown in FIG. 10;

FIG. 12 is a perspective view of a new roof structure; and

FIG. 13 is a fragmentary sectional view of FIG. 12.

Figure 1:
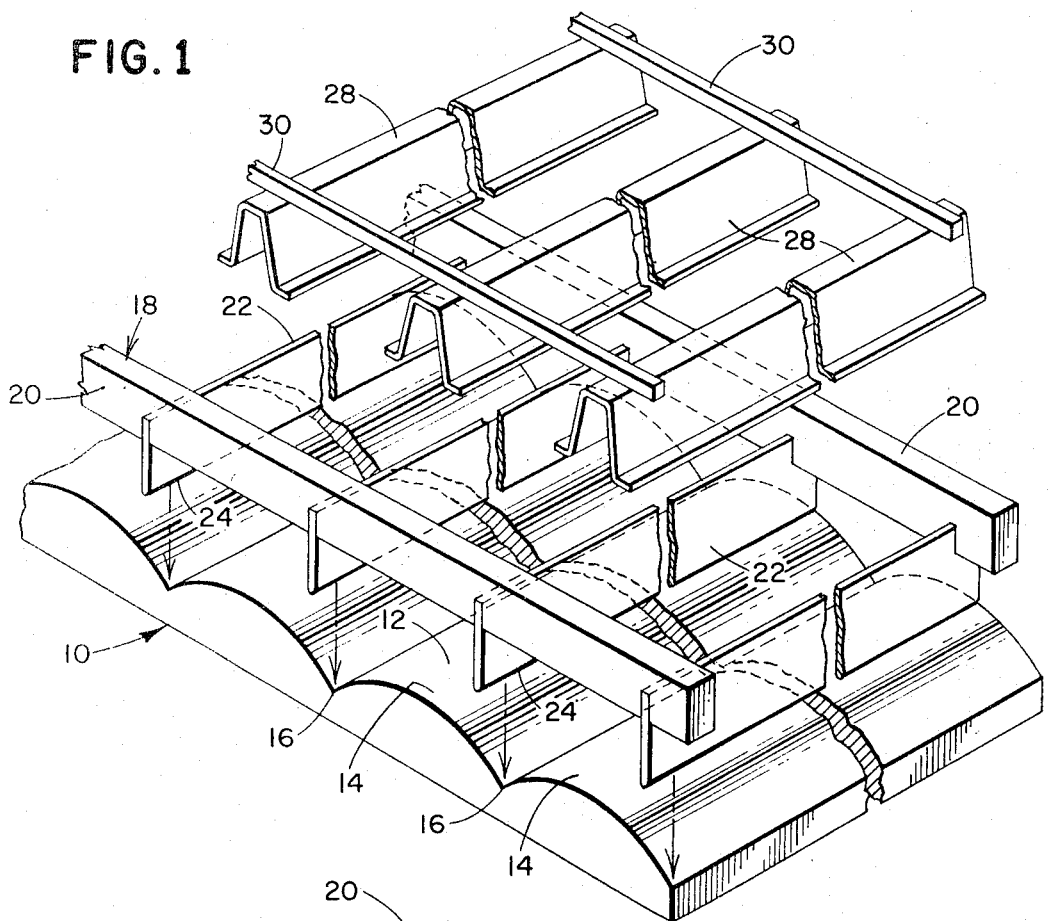
FIG. 1 is a perspective view of fundamental components of the molding apparatus of the invention.

Referring to FIG. 1, numeral 10 denotes a mold body having a corrugated or fluted mold face 12 such as is adapted for forming fluted panels. Numeral 14 denotes the crests of the corrugation, or flutes, and numeral 16 denotes the intervening valleys. As will be obvious, the mold body 10 may be supported in any suitable fashion, either permanently fixed on or within or upon, a movable frame by which it may be positioned at any desirable angle for cooperation with other molds or appurtenant parts. Numeral 18 denotes a shape-generating rack. Rack 18 includes an outer connecting frame 20 and a series of associated longitudinally extending bars or ribs 22. As should be understood, the spacing between bars 22 is determined so as to effect positioning of their lower edges 24 precisely within the valleys 16 of the mold face when the rack is moved into its intended working position. Of course, the bars may be fixed rigidly in position, or they may be mounted for adjustable positioning to any fixed space relationship that is desired. Similarly, the entire rack may be fixed in a single permanent position in relation to the mold, or it may be mounted for movement to any desired position relative to the mold position by any suitable manipulating means. The means for actual movement of the rack 18 into and out of working position with the mold is not illustrated in FIGS. 1–4. Many such means are possible and in fact the rack may be mounted for manual positioning. Further, as will be appreciated, when the rack is fixed in a single permanent position, the mold surface and material may move against the rack, thereby effecting the same result by allowing the mold to deliver the pressure, or by applying pressure to it.

Figure 4:
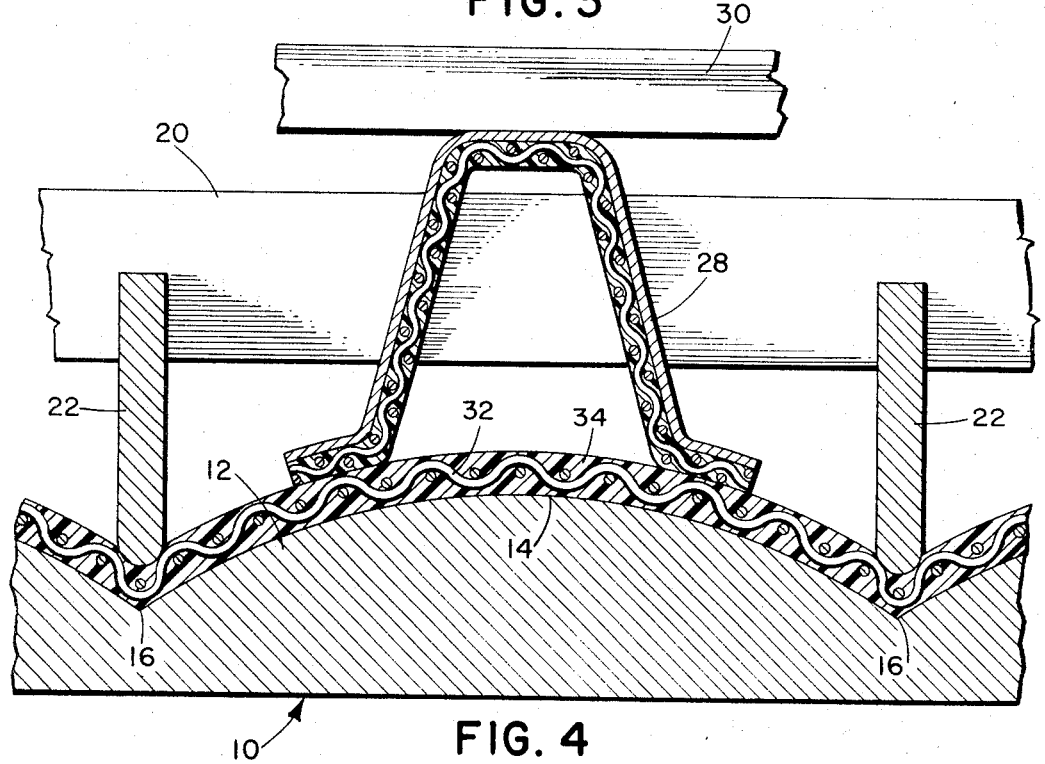
FIG. 4 is a further similar fragmentary sectional view, which also is considerably enlarged and exaggerated illustrating the relative position and association of all of the parts together with the resinous product in the process of being formed, including structural reinforcing means.

Referring to FIG. 1, numeral 28 denotes a plurality of units for holding and delivering resinous reinforcing ribs to the fluted surfaces, as may be more clearly seen in position in FIG. 4. The said units may be held in appropriate assembled and spaced relation by cross members 30. They may be mounted and manipulated in any suitable fashion in cooperation with the rack and mold face. The separate units may be regarded as inverted troughs which serve to provide the rib-like configuration of the reinforcing units and to hold the resinous material in proper form and position for delivery to the panel undergoing formation on the main mold. These units are merely illustrative of the aspect of compound molding and it will be apparent that innumerable other shaped pieces may be similarly applied.

As has been pointed out above in FIGS. 1–4, manipulating means have been omitted for the reason that various means may be readily supplied by those skilled in the art; moreover, it is pointed out that molds of the character described above may be hand-operated provided the components parts are not too heavy. Even so, in many embodiments of the invention, the parts may be moved into and out of position by simple lever mechanisms since only slight pressure is necessary to be applied to the rack in order to accomplish its purpose. The same is true as regards the rib placement means, especially since when the ribs which are in the process of curing are brought into contact with the similarly curing panel, molecular action takes place at the interface at all points of contact. Accordingly, only firm, generally overall, surface contact is required, and high pressure is neither necessary nor particularly desired.

Figure 2:
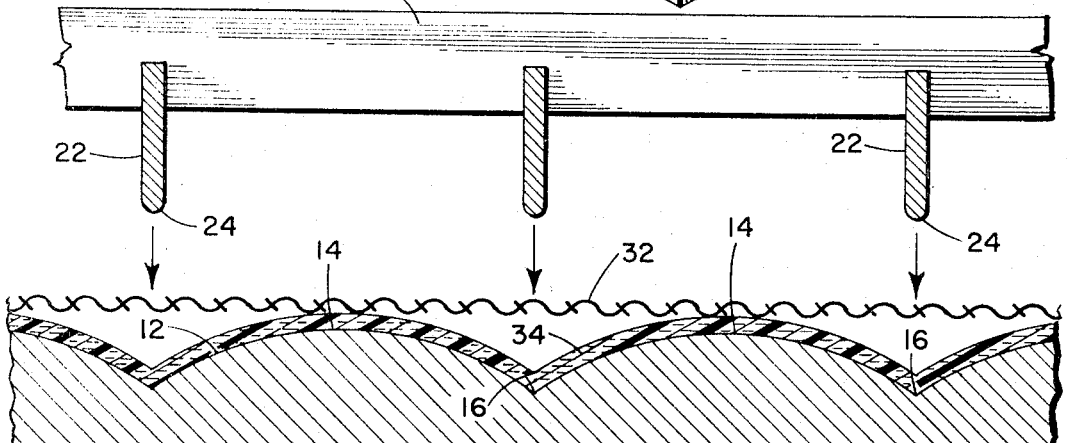
FIG. 2 is a fragmentary depiction of a portion of the mold and materials in a position just prior to the time when the members, in this showing in the form of a rack of members is moved into working position, the showing being enlarged and exaggerated for clarity.
Figure 3:
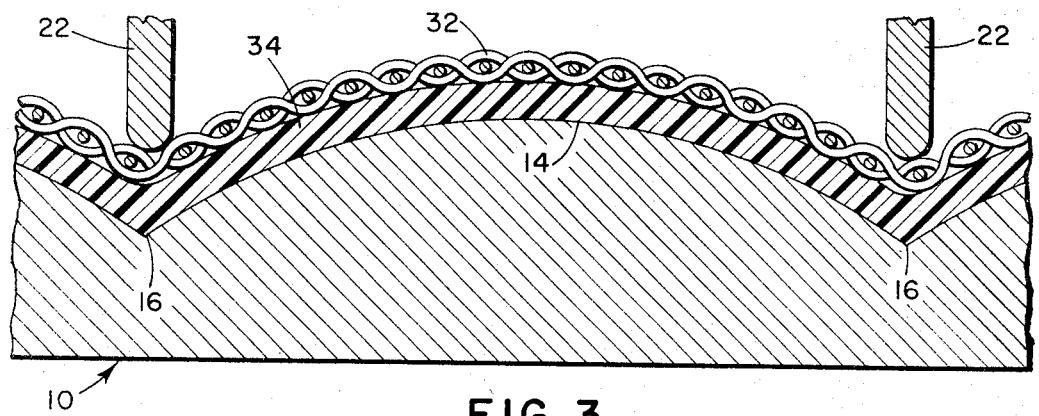
FIG. 3 is a further and similar fragmentary sectional view showing the working parts depicted in FIG. 1 in actual working position, the portion shown being enlarged and exaggerated for clarity.

Referring to FIG. 2 of the drawings, numeral 32 denotes a reinforcing foraminous glass farbic (a glass roving fabric) which has been positioned adjacent the surface of the resinous material, which latter is denoted by numeral 34. (Normally, a parting agent is first applied to the mold surface, if required, but such is omitted for purposes of simplicity.) The positioning of the fabric may be either manual or by machine delivery. The resinous material may be delivered and spread by hand, atlhough preferably it is delivered by means such as spray devices capable of depositing and spreading it uniformally on the mold face. As will be seen in FIG. 2, the reinforcing fabric material bridges across the valleys 16, and it is held at its outside edges (as by weighting and/or clamping) so that when it is contacted by the bar edges 24 in their downward movement as seen in FIG. 3, it is stretched and drawn downwardly into the body of the resin, whereupon in a short time it sinks into and becomes fully embedded in the resin as seen in FIG. 4. The association may be described as involving displacement of the jelly-like resin mass upwardly into the fabric and through the small openings therein.

As will be apparent to those skilled in the art from the fact that the reinforcing material must stretch in order to accomplish the purposes of the invention, the material must be of such strength and character that it does not pull apart or disrupt in the course of practicing the method. In other words a material of substantial integrity such as a woven fabric of stretchable character should be chosen.

From the foregoing, the method steps to be employed and the operation of the equipment in relation thereto should be readily apparent. However, briefly, the procedure involves application of the mold release agent, or parting compound, to the shaped surface of a clean mold followed by the placement of resinous material in proper condition for curing in accordance with the required curing or settling technique. As is well known, there are various settable or curable resins and the present apparatus may be adapted to the needs of any of them in a manner which should be apparent to any skilled artisan. The reinforcing fabric is placed in position over the surface of the resin in a manner such that it assumes the general peak to peak relation indicated in FIG. 2; and while maintaining it under tension. The rack is then manipulated into working position as shown in FIG. 3. The ribs (which may or may not be applied, depending upon the needs of the particular product) can be preformed according to the teachings of this invention and applied (preferably well before the rib resin mass is advanced in curing) to the curing panel surfaces. In this way, the two components molecularly cure interfacially to strong unification. Alternatively the ribs may be prepared by first coating the inner surface of the trough like units with a mold release agent, thereafter applying the resinous material and fabric to the inner surface and hand working the fabric and resin into the desired association. Obviously, it is essential that the resin be forced into and through the open weave of the fabric so that it at least extends through the fabric in order that the resin can make contact with the resin of the panel. When all materials are properly pre-associated, the mold rack is moved into position to effect the unification of the fabric with the resin on the mold face, and then followed by a unit carrying the reinforcing ribs. The resin is then allowed to cure to gel-state following which the rib units and rack are withdrawn. The completed panel may then be removed from the mold. A new and extremely strong product is produced since it is not only a fiber reinforced panel, but the fiber is stressed in situ to form a prestressed reinforced panel, such as is suitable as the sidewall of a house.

As will be understood, any fabric which is employed for reinforcement must be reasonably porous, or foraminous, in order that resin is readily extruded upwardly into and/or through the mesh of the fabric prior to the time the resin is expected to gel. Of course, any type of reinforcing fabric, mat or the like may be employed, such as nylon, rayon, etc., as well as a combination of such fabrics. As is well known, for the best reinforcing results, combinations of resins and fabrics are best chosen such that the fibers are readily and well wetted.

It is desired to mention that the method and apparatus may be employed to effect lamination of a reinforced resin mass to a second resin mass or surface as by first laying down on the mold surface a pigmented curable resin mass, allowing it to gel, and thereafter applying the second resin mass thereupon, which then cures interfacially as the fabric associating operation proceeds. Many variations will occur to those skilled in the art.

The pressure required to be applied by the bars at the contacting area of the panels, which bars suitably are of steel, is very low, for example, as low as 5–6 p.s.i. As will be understood such pressure is active upon the fabric along the length of the bar bottom edges, which edges are, in the embodiment illustrated herein, approximately one-eighth inch wide and are rounded off to avoid sharp cutting edges. (Such edges may be coated or capped by nonbonding material such as nylon, polyvinyl, alcohol etc., for certainty of quick release from the resin.) Somewhat greater pressure may be required in order to press the fabric into the resin more quickly if a rapid curing rate is selected, or if a fabric is chosen which is not so readily penetrated. It may be remarked that while such full penetration through glass roving fabrics is not time-wise unduly long, it is not instantaneous. For example, complete penetration and good wetting requires several minutes and such penetration must be complete to the extent desired for the particular product prior to gelling of the resin mass. As will be understood, the fabric may be only partly pressed into the resin mass, as for instance where only a strongly held backing is desired or where it is desired to unite a second material with the fabric. Furthermore, a very thick layer of resin may be laid down and the fabric then drawn into it only partly through such layer. Thus, it is not seen to be critical that the fabric be forced to the mold surface. As regards pressure, however, additional pressure may be applied in any instance where desirable.

The foregoing description of the general principles of the method and specific apparatus of the invention in relation to a fluted panel is by no means intended to limit the invention unduly. It is desired to mention, by way of further elucidation, several modified forms of apparatus which may generally be employed similarly as in the foregoing description, and which dramatically extend the versatility of the method and apparatus within the general principles of the invention.

Referring, for example, to the bar members 22, as seen in the specific illustration, such are continuous straight steel pieces which rest upon the working surfaces and apply pressure along a straight line in a single horizontal plane. It is pointed out that members such as members 22 may be provided having any desired configuration so that pressure may be delivered along any line in a curvilinear surface. Thus, members 22 may present a curving pressure-edge wherein the edge would lie in a single horizontal plane. Similarly, such edge may itself be of a vertically undulating character so that pressure may be applied simultaneously in infinite horizontal planes, along straight lines. Again, such edge may be determined in configuration to simultaneously deliver pressure in an infinite number of horizontal and vertical planes by curving the edge lengthwise for horizontal accommodation and giving it an undulating or vertically curing character for vertical accommodation. Thus, the general principle of pressure application is applicable to complement substantially all, if not all, mold topography.

Further, member 22 has been described as a bar with a continuous pressure edge uniformly applying pressure at all points of any given mold surface line. It is desired to point out that such is by no means essential or critical. Thus, as seen in FIG. 5, rack 36 is provided with a series of spaced pressure rods or pins 38 which in operation perform the same function in substantially the same way as members 22. Pins 38 may be mounted for both horizontal and vertical adjustment, as may be seen in FIG. 6 wherein the rack 36 is shown as slotted to permit variability of horizontal pin position, and pins 38 are threaded and provided with nut locking means for vertical adjustment.

Further, rack 36 may take the form of a flat plate provided with any number of slots, of any length extending in any desired directions, for accepting the pins and permitting their concurrent vertical and horizontal adjustment for pressure application as desired in relation to substantially any mold surface. This form of apparatus has special applicability where both concave and convex surfaces are present in a given product.

Obviously, in any rack and pin assembly, as many pins as desired may be employed, it being only necessary that they draw the fabric uniformly or as desired. Moreover, for particular needs, the pins may extend at any desired angle relative to the vertical; and they may selectively be employed to deliver increased screw or spring loaded pressure in a particular local area, it being necessary only that the overall weight of the rack be sufficient to offset the resistance of the fabric to stretching or drawing to such screw pressure. As will be appreciated, weight of the rack assembly may be employed in various ways to offset unusual drawing and fabric conforming intricacies while not unduly increasing the weight for overall pressure requirements.

The bars or pins may be replaced by wires or cords which are attached to any shape rack, the wires being adjustable in length if desired so as to conform to the shape of any bulging curving surface. For example, a Quonset-hut type structure, or a similar roof structure may readily be produced.

It should be apparent that various settable or curable resin systems or formulations are useful in the invention. The technology of such resins is highly developed and well known. Thus, either heat settable or catalytically curable systems may be employed. The polyester systems are in wide use in industry at present and they are particularly applicable in illustrating the present invention. An overall treatment of various types of polyester and other resins is set forth in "Encyclopedia of Polymer Science and Technology," copyright 1970 by John Wiley & Sons, Inc., Library of Congress Catalog Card Number: 64–22188, which publication is incorporated herein by reference. Pages 129–168 of Volume 11 are particularly applicable for purposes of describing exemplary useful curable polyester resins and formulations relative to this invention. As will be observed, there are many much resins, which perform generally similarly as to curability, and their intrinsic properties in end products are related to particular chemicals employed and the proportions, etc., in the basic polymer forming reaction.

A suitable and exemplary formulation for use in the method and apparatus of this invention is one supplied by American Petrochemical Corporation, Miami, Fla., as set forth in their specification sheet designated as A.P.C. Resin 1816. This polyester resin system (A.P.C. 1816 Resin) is thought to be comprised of (1) a relatively low molecular weight polyester prepolymer, such as is formed from a mixture comprising a saturated dicarboxylic acid, an unsaturated dicarboxylic acid, and a dihydric alcohol, for example, a mixture including such as (a) phthalic or isophthalic acid, (b) fumaric or maleic acid, and (c) propylene glycol or a mixture thereof with other glycols such as diethylene glycol, and (2) a vinyl monomer, especially styrene. The curing reaction of these materials involves cross-linking of the polyester molecules at the unsaturated sites by styrene. Such resin formulations usually contain an inhibitor which inhibits premature reaction of the resin system. In curing, i.e., effecting crosslinking, the polyester resin is reacted with the vinyl monomer under catalytic action of such as methyl ethyl ketone or benzoyl peroxide. The rate of reaction is readily controlled over a wide time span by the quantity of catalyst added to the resin formulation as supplied to the mold surface. The catalyzed reaction is quite temperature sensitive and catalyst quantity requires to be interrelated therewith for precise production needs. Under controlled temperature conditions, such as at 75° F., 0.5–1.5% by volume of catalyst results in gelation time of from about 65 minutes downward to about 25 minutes. At these same catalyst additive amounts, but at 85° F., gelation time is downwardly from about 36 minutes to about 20 minutes. Different catalysts perform generally similarly as regards quantity effect, but, depending upon the catalyst activity, a given quantity may effect a relatively slower or faster reaction. The activity of the resin system may thus be easily controlled or tailored to the needs of the fabricator. The resin formulation and catalyst are admixed just prior to or simultaneously with application to the mold surface. A suitable method employs simultaneous separate metered spraying of resin and catalyst so that they properly intermix as laid down on the mold surface.

One further point of importance may be mentioned as regards resin preparation for purposes of this invention. Polyester resins of the type just described require to be adjusted in viscosity so that they lay on the mold surface without flow under gravity following application and as they cure, especially unless the resin is trapped and held by the fiber glass quickly. The adjustment is made by addition of a thickening agent in quantity such that a normally rapidly flowable resin assumes the character of a jelly-like mass. The adjustment technique is well known to the art. Usually, a quantity of a very finely divided powder is employed, the powder being essentially non-reactive chemically such as silica powder in the submicron particle size range. A suitable such material has long been sold by the Godfrey L. Cabot Corporation of Boston, Mass., under the trademark Cab-O-Sil, described as about 99.8% fumed silica, specific gravity 2.5 average particle size of 0.015–0.020 microns. The J. M. Huber Corporation, New York, N.Y., sells similarly effective materials.

In this specification of the present invention and the claims appended hereto the various rack forms are considered as force or pressure delivery members having fabric contacting means which may be provided to contact the fabric at any desired pattern of points or lines in the overall bulging mold surface. As is readily envisioned, such points or lines may lie in a single horizontal plane passing through the mold or in an infinite number of such horizontal planes.

The invention extends also to embedding of fabric in the setting or curing mass where the mass is layed down on an essentially flat panel molding surface, the force being applied along lines or at points about the perimeter, or portion thereof, of the mass, to or at a level below the mass upper level, whereby the fabric is drawn downwardly over the general perimeter edges and the intervening fabric is stretched and drawn downwardly into the intervening mass. The small arc resulting in the fabric surface above the main resin mass may require to be lightly weighted by intervening pins or bars. Similarly, pin or bar pressure means may be brought to bear upon selected points or areas on the overall fabric surface whereby the pressure means effectively sinks the fabric into the resin, i.e., displaces the mass into or through the fabric not necessarily stretching the fabric. In a similar fashion convex and concave surfaces may be accommodated.

As will be apparent, reinforcing materials may be embedded in any generally settable plastic mass according to this invention. For example, reinforcement may be incorporated in a mass of gypsum undergoing setting hydration.

Referring to FIGS. 8–10, the method and apparatus of the invention is illustrated in a form especially adapted to molding of very large pieces such as walls, roofs and floors of houses or buildings of any desired dimensions on a highly desirable and practical industrialized basis. In this type of apparatus, the pressure bars, such as held in a rack in FIGS. 1–4, are individually mounted for separate sequential movement into position. It is desired to point out that, while the rack system is highly useful in forming small to medium pieces of up to a few feet dimensions, where for example, it is desired to mold a piece 8 feet by 12 feet or 24 feet or more, it is exceedingly difficult (but not impossible), to build a rack and mold system which will provide the necessary overall uniform matching for precision molding. Accordingly, the pressure bars are separately mounted for individual rapid positioning immediately following the placement of the glass fabric in the position to which a particular bar relates. Each individual bar is preadjusted to proper line contact with its corresponding mold line. Moreover, in such type of operation a truly quite fluid resin system may be laid down without significant running on the mold surfaces since the resin is immediately trapped by the glass fabric which is forced into position at once.

As is well known, it is considered not to be possible, as a practical matter to build very large precision molds. In the present invention large mold surfaces are found possible by use of a number of uniform precision made small mold surfaces which are then joined in continuous position to form a single uniform surface.

Referring more particularly to FIGS. 8–10, numeral 100 denotes a plurality of mold surfaces supported upon spaced brackets 102 which in turn are mounted upon standards 104. The molds are bolted into position in slotted openings in the brackets so as to be fixedly and precisely positioned relative to each other.

Numeral 106 denotes a gravity flow resin distributor mounted above the mold surface upon a travelling carriage member denoted by numeral 108. The carriage member in turn is supported on rollers, by brackets 110, which are within the roller trackways 112, which latter are fixed to standards 104. The resin distributor is provided with a downwardly extending section 114 having small holes in its bottom portion, the holes being spaced and in tandem relation for uniform distribution. The downwardly extending portion 114 serves to provide a deep head of resin above the holes and thereby a relatively constant rate of resin flow as the distributor traverses the mold face. In normal operations, the difference in rate of flow is insignificant as the level of resin falls, since the small holes themselves limit the quantity which may pass under gravity, and the tank is designed to contain the volume of resin actually distributed in the portion above the extending section 114. Further, however, in some instances it may be desirable to slow the rate of travel of the distributor as it traverses the mold.

Reinforcing material 116 is also carried in sheet form by the carriage member which supports a drum 118 on members 120. As will be noted, the glass fabric is anchored at a point such as at numeral 122. The carriage is drawn across the face of the mold by a cable 124 which is taken up by a reel 126 driven by a motor 130, having means for automatic cutoff and reversing.

Numeral 132 denotes pressure bars mounted for holding and automatic release from points above the level of the carriage 108. Separate holding and release means are provided for each bar, such means being denoted generally by numeral 134. Each such means comprises a pair of elongated arms 136, joined together as by spacers 138, which are pivotally mounted at point 140 in brackets 141. Arms 136 are held in their up position by latch means mounted in cooperating relationship on the upper side of the trackways 112 and between the proximate end of arms 136, as at numeral 142. Brackets 141 are supported by a rigidly held member 143, positioned an appropriate distance above the mold face. As will be understood, member 143 forms a part of the overall superstructure of the molding apparatus.

Pressure bars 132 are pivotally supported by arms 136 from a common pivot means, or bearing, as at numeral 144, by means of angle arm means 146, the latter firmly and rigidly holding the pressure bars. Obviously, when the angle arms are fixed in position upon the pressure bar(s), the center of gravity of the unified pieces should be immediately below the pivot point 144 to assure parallel relation of the pressure bars and mold face. Additional means serving in this connection are described at a later point herein. Further, it should be apparent that careful alignment of arm-supporting means is critical to precision placement of the pressure bars.

As will be appreciated, upon release of the arms 136 from their latching means, the pressure bars fall under gravity to the mold face. However, unrestrained fall is not desirable, as should be apparent. Thus, restraining means are provided by a hydraulic unit 148, pivotally extending from the upper end of bracket 141 to arms 136, pivotally connecting thereto as at numeral 150. As will be appreciated, the piston rod of the hydraulic means is of such length as to permit the pressure bars to descend to their ultimate resting position. In other words, the piston of the hydraulic unit should yet permit some small rod extension after the pressure bars have completed their full descent into the resin mass; otherwise their pressure effects would be foreshortened.

The holding and release means 134 further comprises a refinement serving to direct the pressure bars precisely to their proper working position. This refinement involves elements 152 and 154.

As will be seen in FIG. 10, element 154 is securely attached to angle arms 146 as at numeral 156. Accordingly, the said pieces move as one. Further, element 154 is pivoted on common pivot point 144. Element 152 is pivotally mounted on fixed bracket 141 as at numeral 158 and it is interrelated with element 154 on common bearing 160. Thus, there is conjoint movement of elements 152 and 154 as arms 136 pivot about bearing means 141. Since angle arm means 146 are fixedly interrelated, the entire assembly moves in unison; however, the line of travel of the pressure bars as they move toward the mold surface is directly controlled by element 154. In effect, the pressure bars are cranked into position. This is desirable because, otherwise, they would be at liberty to swing in bell-like fashion about common bearing 144, and they would so tend to swing since said bearing point travels arcuately downwardly as arm 136 pivots at point 141. As will be appreciated, such motion would cause the pressure bars to contact the glass fabric and mold surface at an end point. Accordingly, precision contact is consistently attained by fixing element 154 to the angle arms only after the entire assembly is lowered to the horizontal working position of the bars on the mold surface. At such time, the entire assembly is in a state of repose and the proper angular relationship of element 154 and angle arms 146 is established.

Numeral 170 indicates a brake, or tensioning device, which serves to maintain the desired tension on the fabric. The tension may vary widely but in no case should it exceed the pressure potential of the bars since, otherwise, they could not be lowered. Where the individual bars deliver a pressure of about ten (10) p.s.i. the tension may suitably be, for example, six (6) p.s.i.

Referring particularly to FIGS. 9 and 10, it will be noted that the carriage 108, the fabric and resin distributor are shown in phantom lines beyond the mold surface to the left and right, and in full lines as the equipment traverses the mold. The showing of the mechanisms 134 in outline is for simplicity of illustration. It will be understood that each such bar operating mechanism is similar in all respects with associated latch means.

Numeral 162 refers to a connecting element similar to element 154, but not having the extending leg as at numeral 164.

Numeral 166 denotes a latch release arm attached to carriage 108. As will be observed, arm 166 extends upwardly and rearwardly of the carriage such that no latch is released until after the carriage and roll of glass fabric has passed the latches, and it then contacts release fingers 168 in succession.

In preparation for molding, the mold surface is cleaned and coated with a suitable mold release agent. The resin, together with curing agent and other desired components, is supplied to the distributor. Tension on the drum is set to the desired level. The carriage is then activated to move across the mold face, distributing the resin while unreeling fabric from the drum. When the drum and fabric have passed the first latch point, the initial bar is automatically unlatched and it descends into its pressure position very quickly, for example 2–3 seconds. Each succeeding bar falls similarly as the carriage moves continuously across the mold face. As the last latch is released, the carriage is stopped and the fabric drum (then empty) is lowered to a point below the mold surface where its weight is allowed to assist in maintaining tension on the fabric. The resin distributor is promptly cleaned. The resin and glass fabric are allowed to remain on the mold until such time as it is sufficiently cured. Thus, a molded product of a prestressed, reinforced character is readily produced.

As will be understood, the rate of carriage travel may be very rapid. Therefore, very rapidly curing resins systems may be employed.

Aside from curing, it is easily possible to complete a very large molded piece within one minute from the time the equipment is set in operation.

The latch means may be of any type desired; preferably it is as simple as possible, for example, a simple mechanical gate latch having a keeper with a cam surface by which it is moved to open position for latching upon a cooperating latchpin, and following which, the keeper falls by gravity to latched position about the pins. Release of the latch is by rotation of the keeper and relative movement of the keeper away from the latchpin by being carried upwardly by the pivoting mechanism. As mentioned above, in the present invention the keeper terminates in a finger-like portion extending into the path of the travelling latch release arm which is provided with a camming surface designed to rotate the keeper to its release position.

It is pointed out that individual lowering of pressure bars is not critical. Thus, a combination of a few bars, for example, 2–4 or 5 in rack may be lowered simultaneously; however, problems of precision seating tend to arise where the rack becomes too large. The individual bar system has thus far been found to be very satisfactory, and it permits of great versatility.

The particular system or mechanism by which the bars are manipulated obviously is not critical. It should be clear that there are many mechanical, hydraulic and/or electrical arrangements by which the bars could be handled in an equivalent or satisfactory manner. Therefore, the invention is not to be understood to be limited to the specific means described and shown.

Further, the invention is not to be understood to necessarily involve the resin distributing means and method and/or glass lay up as particularly described and shown in FIGS. 8 and 9. Thus, the resin may be sprayed on and the glass fabric thereafter positioned over the resin as in connection with FIGS. 1–4, the bars thereafter being positioned in any suitable manner according to the teachings herein.

Numeral 172 of FIG. 7 denotes a side panel produced according to the invention. Since it is composed of a number of arcuate portions, all unified by common molding, it constitutes a series of beams, and standing vertically, i.e. axes of the arcs being vertical, it is therefore exceedingly strong as a roof load-carrying member, yet it is exceedingly light in weight. As indicated above, it is also greatly increased in strength by prestressing of the fabric.

FIGS. 12 and 13 show a unitary roof produced according to the invention. The roof is molded as one piece on a preformed mold in accordance with the above technique, the reinforcing glass fabric being stressed in the same manner. The roof is molded as a series of sloping steps extending away from the roof center line 174. The sloping surface 176 and 178 extend continuously for the full length of the roof and they constitute a roof having an inherent beam-like character. In effect, the result is that a roof is produced which is a series of beams, and which has great rigidity and load carrying ability. The roof is provided with transverse reinforcing members 180, which are also molded and continuous. They are molded to conform to the underside of the roof and are adhered (cured) thereto in the same manner as described hereinabove in connection with the reinforcing ribs seen in FIG. 4. A suitable angle of slope for surfaces 176 and 178 is from 10°–15° from the horizontal and vertical respectively, although, as will be appreciated, such range is not critical. The beam-like character is provided so long as surfaces 176 and 178 merge at points 182 at an angle, i.e., any angle. Moreover, there is no criticality in the relative lateral dimensions of surfaces 176 and 178.

It is pointed out that the carriage 108 may transport a plurality of rolls of fabric which may be laid down simultaneously to provide various laminate thickness. Such rolls of fabric may be different in character, structure, etc. Moreover, such plural rolls may or may not be coextensive in widths, and the rolls may be offset for lapping purposes. They may be disposed at any angle relative to the mold surface as required. The fabric may be precut to accommodate openings such as for windows. The resin distributor may be provided with means to stop the flow of resin through a segment of its openings corresponding to such openings. The resin distributor heretofore has been indicated to be of the gravity-flow type, however, it may be a sealed unit under small pressure, if desired, in which case section 114 may be eliminated. The resin distributor as illustrated herein is quite satisfactory. It may be mentioned that when designed as seen in FIG. 8A it inherently rests in the flow or no-flow positions by reason of the relation of its center of gravity and its supporting pivot point. It is readily turned to flow position at the start of operation by suitable cam means mounted on standards 104.

What is claimed is:
1. A method for the production of shaped reinforced resinous products comprising the steps of:
    (1) depositing a mass of shapable and settable or curable substance upon a mold surface, said mold surface having a plurality of bulging portions each portion being separated from at least one other said portion by a depressed area,
    (2) positioning a reinforcing foraminous fabric of such strength that it is capable of maintaining its integrity under substantial stretching without disruption and holding said fabric under tension over the surface of said mass,
    (3) embedding said foraminous fabric in said mass by application of pressure directly to said fabric only in plural restricted areas thereof, said restricted areas corresponding to said depressed areas, while continuing to maintain said fabric under tension and effecting a stretching of said fabric to conform to the contour of said bulging mold surface,
    (4) curing the said substance while said material is so stretched and embedded, thereby producing a prestressed product,
    (5) said restricted areas being generally defined by a series of points corresponding to points on the said mold, from which latter points, lines definitive of said bulging surface may be considered as originating.
2. A method as claimed in claim 1 wherein said restricted areas are limited substantially to spaced points.
3. A method as claimed in claim 1 wherein said mass is comprised of a polyester resin.
4. A method as claimed in claim 1 wherein said reinforcing material is a glass fiber fabric.
5. A method as claimed in claim 1 wherein said spaced areas are limited substantially to spaced lines.
6. A method as claimed in claim 1 wherein, following deposition of said substance, a reinforcing material is continuously drawn under tension across the said mold surface and the operation of embedding said material is begun substantially immediately and sequentially following its arrival above each of said restricted areas.
7. The method as defined in claim 6 wherein said substance is a curable polyester resin system and said reinforcing material is a glass fiber fabric.
8. Method for the production of shaped reinforced resinous products comprising the steps of:
    (1) depositing a mass of deformable and curable resinous substance directly upon a mold surface, said mold surface having a plurality of bulging portions each portion being separated from at least one other said portion by a depressed area,
    (2) positioning adjacent the surface of said mass a reinforcing foraminous fabric of such strength that it is capable of maintaining its integrity under substantial tension without disruption, and holding said fabric under tension,
    (3) embedding said foraminous fabric in said mass by application of pressure directly to said fabric only in plural restricted areas thereof, said restricted areas corresponding to said depressed areas, while continuing to maintain said tension, said restricted areas generally lying in one or more horizontal planes below the level of the remainder of said foraminous fabric, whereby the fabric is stretched over the area intervening between the areas of application of force and said mass is displaced into the foramina of said fabric as said mass is displaced upwardly throughout the fabric, (4) and curing the said substance while said fabric is so embedded and stretched, thereby producing a pre-stressed product.

9. A method as claimed in claim 8 wherein said mass is comprised of a polyester resin.

References Cited

UNITED STATES PATENTS

| 3,064,308 | 11/1962 | Caspersen | 161—Dig. 4 |
| 2,706,832 | 4/1955 | Frost et al. | 161—Dig. 4 |
| 3,389,031 | 6/1968 | Rosaen et al. | 156—205 X |
| 2,784,763 | 3/1957 | Shorts | 156—85 |

ROBERT F. WHITE, Primary Examiner

W. E. HOAG, Assistant Examiner

U.S. Cl. X.R.

264—231, 257, 271